US007367361B2

(12) United States Patent
Steingass

(10) Patent No.: US 7,367,361 B2
(45) Date of Patent: May 6, 2008

(54) EDUCTOR APPARATUS

(75) Inventor: Robert W. Steingass, Valparaiso, IN (US)

(73) Assignee: Task Force Tips, Inc., Valparaiso, IN (US)

( * ) Notice: Subject to any disclaimer, the term of this patent is extended or adjusted under 35 U.S.C. 154(b) by 242 days.

(21) Appl. No.: 11/090,633

(22) Filed: Mar. 25, 2005

(65) Prior Publication Data

US 2006/0213565 A1 Sep. 28, 2006

(51) Int. Cl.
*G05D 11/03* (2006.01)

(52) U.S. Cl. .................. 137/893; 137/543.21; 137/895

(58) Field of Classification Search ................ 137/892, 137/893, 894, 895, 897, 543.21
See application file for complete search history.

(56) References Cited

U.S. PATENT DOCUMENTS 2,953,160 A * 9/1960 Brazier .................. 137/599.12
3,154,101 A * 10/1964 Cravits ....................... 137/893
3,181,563 A * 5/1965 Giffen ........................ 137/596
3,457,949 A * 7/1969 Coulter .................. 137/543.21
3,810,787 A * 5/1974 Yoeli et al. ................... 134/29
4,645,009 A * 2/1987 Hawelka et al. .............. 169/15
5,301,718 A * 4/1994 Bolhofner ................... 137/893
5,794,657 A * 8/1998 Oberg .................. 137/543.19
5,960,887 A 10/1999 Crabtree
6,102,308 A 8/2000 Steingass et al.
6,382,247 B1 5/2002 Gundry
6,601,603 B2 * 8/2003 Griffin ........................ 137/240
6,634,376 B2 10/2003 Haas
6,725,940 B1 4/2004 Klein et al.

* cited by examiner

*Primary Examiner*—Stephen M. Hepperle
(74) *Attorney, Agent, or Firm*—Maginot, Moore & Beck

(57) ABSTRACT

An eductor assembly includes an inlet connectable to a high pressure water source useful in firefighting, an outlet connectable to a fire hose and/or nozzle, and a venturi therebetween. An additive inlet communicates with the venturi so that a chemical additive, such as a foam concentrate, is educed into the output stream. A check valve is positioned at the additive inlet to open under venturi flow conditions and remain closed otherwise. An actuator is provided that holds the check valve in its open position while water flows through the eductor assembly under non-venturi conditions to produce a back flow through the additive inlet and ultimately through the additive fluid circuit, including the additive metering valve components. A return element may be disposed within the eductor body to return the check valve to its closed position when the back flow ceases.

31 Claims, 5 Drawing Sheets

EDUCTOR APPARATUS

BACKGROUND OF THE INVENTION

The present invention relates to fire-fighting equipment, and more specifically to equipment coupled to a fire hose or pipeline for integrating an additive to a water stream.

Fire fighting systems typically include a fire truck, such as truck T in FIG. 1, which includes a pumping unit P that pumps water under high pressure from a tanker truck or a nearby fire hydrant, through a fire hose $H_1$, $H_2$ and nozzle N. While water alone is sufficient for most fires, some fires cannot be efficiently controlled or extinguished by water alone. In this case, certain chemical additives are introduced into the water line to be discharged onto the particular type of fire. Incidents involving flammable liquids or hazardous materials often require the use of a foam that is spread over the fire to starve the fire of oxygen or to suppress noxious vapors. For instance, Class A foam concentrates are used for wildland, rural and urban fire suppression on Class A fuels, such as wood, paper and other solid materials. Class B foam concentrates are primarily intended for Class B materials, such as flammable liquids containing hydrocarbons or polar solvents, and can be used for vapor suppression or extinguishment.

There are numerous approaches to introducing chemical additives or foam concentrates into the flow through fire-fighting water lines. Some systems utilize additive pumps for forced injection of the chemical into the water line. Such systems are generally complicated and are not portable. On the other hand, portable systems rely upon the movement of water through the fire hose to educe the chemical. In the context of the present invention, educe or induct means that liquid is drawn into the system, such as by the flow of another liquid. In one typical arrangement, a foam bucket F contains a liquid foam concentrate that is induced into the fire hose $H_2$ by a foam eductor valve E. This typical eductor valve E relies upon venturi flow to draw the foam concentrate from the foam bucket F into the water stream passing through the eductor E.

The chemical additives or foam concentrates are often corrosive and usually expensive. Thus, the typical eductor valve E includes a check valve system to prevent backflow of water into the chemical supply. For instance, the by-pass eductor described in U.S. Pat. No. 5,960,887, includes a ball check valve integrated into a foam concentrate metering valve.

While the check valve is important to prevent water backflow, it can be problematic with respect to cleaning the eductor valve E. In fire-fighting equipment back-flow typically occurs when the discharge nozzle N is shut off or when the hose $H_2$ is kinked so that fluid discharge is terminated. Without cleaning, the chemicals passing through the valve may congeal and foul the valve or the metering orifice used to control the quantity of chemical introduced into the water stream. In an extreme case, the valve may be stuck open or closed. Prior devices require disengaging the eductor valve from the water line, connecting the water supply hose $H_1$ to the chemical inlet of the eductor valve E, and flushing the valve with water. This process is cumbersome, but perhaps more significantly this approach can be hazardous. In particular, disengaging a eductor valve filled with a chemical additive of foam concentrate will necessarily result in a chemical spill.

What is needed is an eductor valve apparatus that satisfies all of the necessary functions of an eductor, but that is easy and safe to clean. Such an apparatus would allow controlled flushing so that the chemicals can be safely collected without risk of spilling. A further need is the ability to readily determine the position of the check valve and to manually alter it.

SUMMARY OF THE INVENTION

To address this unmet need, the present invention contemplates a system for preventing actuation of a check valve within an eductor assembly. In one embodiment, the present invention contemplates an eductor assembly for use with firefighting equipment that comprises an eductor body defining a fluid inlet connectable to a source of a firefighting fluid (e.g., high pressure water), a fluid outlet for dispensing fluid therefrom in fluid communication with the fluid inlet, and an additive inlet connectable to a source of an additive to the firefighting fluid and in fluid communication with the fluid outlet. The additive can be, for example, a foam concentrate that is educed to mix with the high pressure water under venturi flow.

The eductor assembly further comprises a check valve disposed between the additive inlet and the fluid outlet that is moveable, in response to a flow of water through the fluid inlet, between a first position operable to prevent back flow of water through the additive inlet and a second position to permit flow of additive through the additive inlet to the fluid outlet. In other words, the check valve is open to permit the eduction of the additive under proper venturi conditions, but otherwise closes the additive inlet.

In one important feature of the invention, means are provided for holding the check valve in its open position while allowing water back flow through the additive inlet. This feature allows the additive fluid circuit to be back flushed and thus cleaned after use. In one embodiment, this means includes an actuator operable from outside the eductor body to move the check valve to the second position. In a more specific embodiment, this actuator is an elongated pin having a proximal end manually accessible outside the eductor body and an opposite working end engageable with the check valve to move the check valve to the second position. The actuator preferably includes a push button mounted to the proximal end of the pin to facilitate manual operation of the actuator.

Preferably, the actuator pin is sized so that it does not contact the check valve in its non-actuated position. In the preferred embodiment, means are provided for biasing the pin to this non-actuated position away from engagement with the check valve. When the push button is manually pressed, the pin moves against this biasing means to contact and push the check valve to its open position.

The eductor assembly further comprises a metering head in fluid communication with the additive inlet, in which the metering head includes a metering inlet connectable to the source of the additive and an adjustable metering element disposed between the metering inlet and the additive inlet. The actuator is supported by the metering head to engage the check valve to move the check valve to the second position. Where the actuator is an elongated pin, the pin is slidably disposed within the metering head and has a proximal end manually accessible outside the metering head and an opposite working end engageable with the check valve to move the check valve to the second position.

In one embodiment, the metering element is connected to a proportioning knob movably mounted to the metering head, and the knob defines a recess for receiving the push button and a bore communicating with the recess slidably receiving the pin therethrough. In a further feature, the eductor assembly includes a mating assembly between the metering head and the additive inlet of the eductor body for removably coupling the metering head thereto. This mating assembly allows removal of not only the additive metering components, but also the actuator pin and push button.

Preferably, the actuator includes a spring between the push button and the proportioning knob within the recess. The spring is arranged to bias the pin away from engagement with the check valve. In certain embodiments, the pin extends through the metering element, which can comprise a hollow proportioning ball defining a plurality of differently sized metering openings arranged to be selectively aligned with the metering inlet, and a hollow stem coupled to the proportioning ball and defining a passageway to slidingly receive the pin. A fluid sealing element or seal ring may be disposed between the pin and the hollow stem.

In the preferred embodiment, the check valve includes a valve disc sized to close the additive inlet in the first position and a number of alignment wings projecting from the valve disc into the additive inlet when the check valve is in either of the first and second positions. Thus, the wings maintain the position of the check valve as it moves between its open and closed positions. The wings are sufficiently dispersed to allow substantially unimpeded flow of additive of water back flow through the additive inlet. In a specific embodiment, the number of wings defines a hub arranged to be engaged by the actuator pin when the actuator is operated to move the check valve to the second position.

The invention further contemplates a method of cleaning an eductor assembly used to introduce an additive to a flow of water through a venturi nozzle. The eductor assembly includes an eductor body defining the venturi nozzle, an additive inlet in fluid communication with the venturi nozzle and a check valve disposed between the additive inlet and the venturi nozzle that is open when the venturi nozzle produces suction to educe additive through the additive inlet, and is otherwise closed to prevent back flow through the additive inlet of water passing through the venturi nozzle. The preferred embodiment of the method comprises the steps of moving the check valve to its open position, holding the check valve in that position and then flowing water through the venturi with the check valve open to produce back flow of water through the additive inlet. Preferably, the holding step includes manually depressing an actuator pin slidably disposed within the eductor assembly to push the check valve into its open position.

It is one object of the present invention to provide a system and method for cleaning an eductor assembly that is used for introducing a chemical additive, such as foam concentrate, into a flow of water used to battle a fire.

One benefit of the invention is that the inventive eductor valve apparatus satisfies all of the necessary functions of an eductor, but is easy and safe to clean. A further benefit of the apparatus is that it allows controlled flushing so that the chemicals can be safely collected without risk of spilling. Yet another benefit is provided by the ability to readily determine the position of the check valve and to manually alter it.

Other objects and benefits of the invention will become apparent upon consideration of the following written description, taken together with the accompanying figures.

DESCRIPTION OF THE PREFERRED EMBODIMENTS

Figure 1:
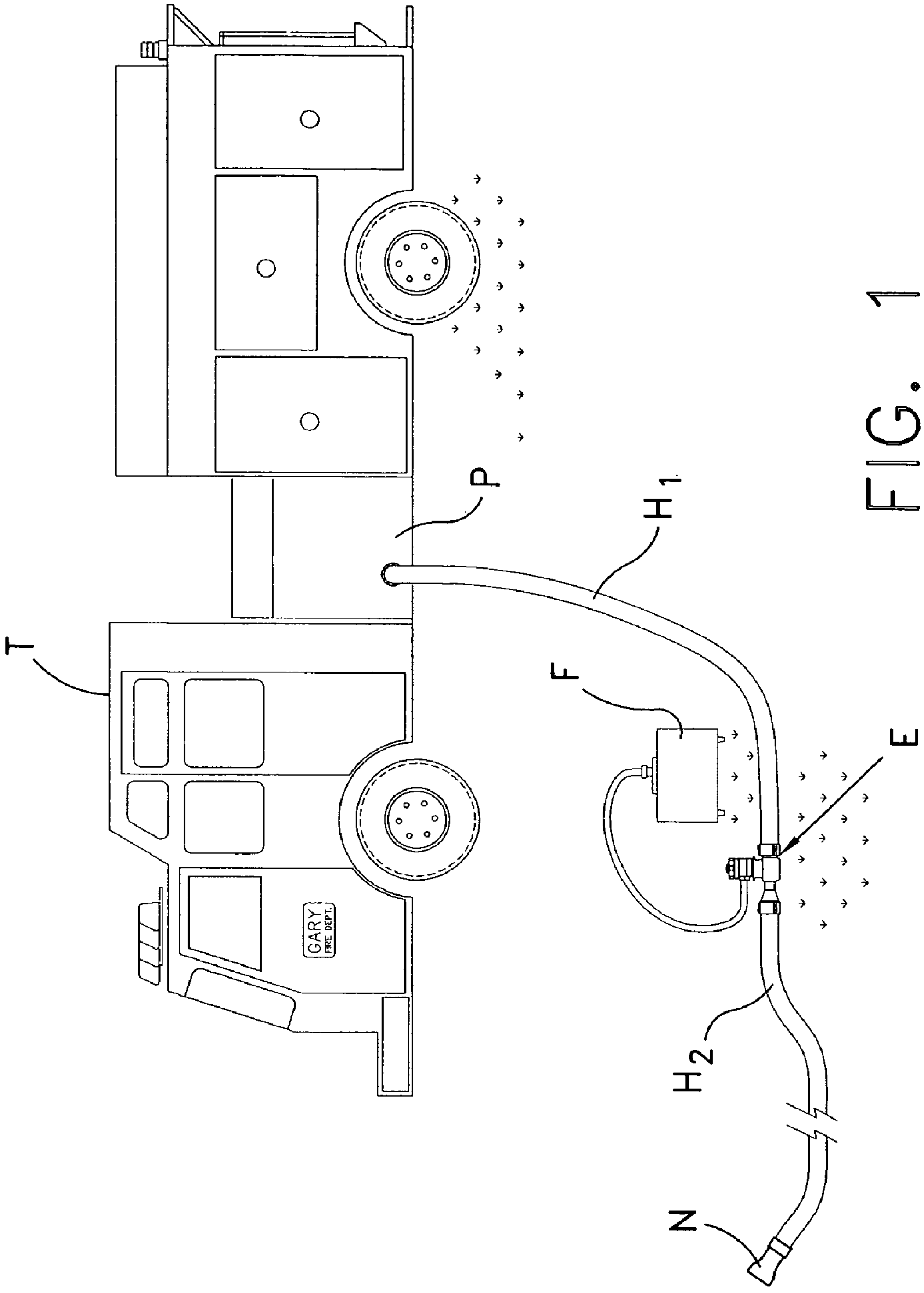
FIG. 1 is a pictorial representation of a fire truck equipped for dispensing a foam for fire or vapor suppression or extinguishment.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
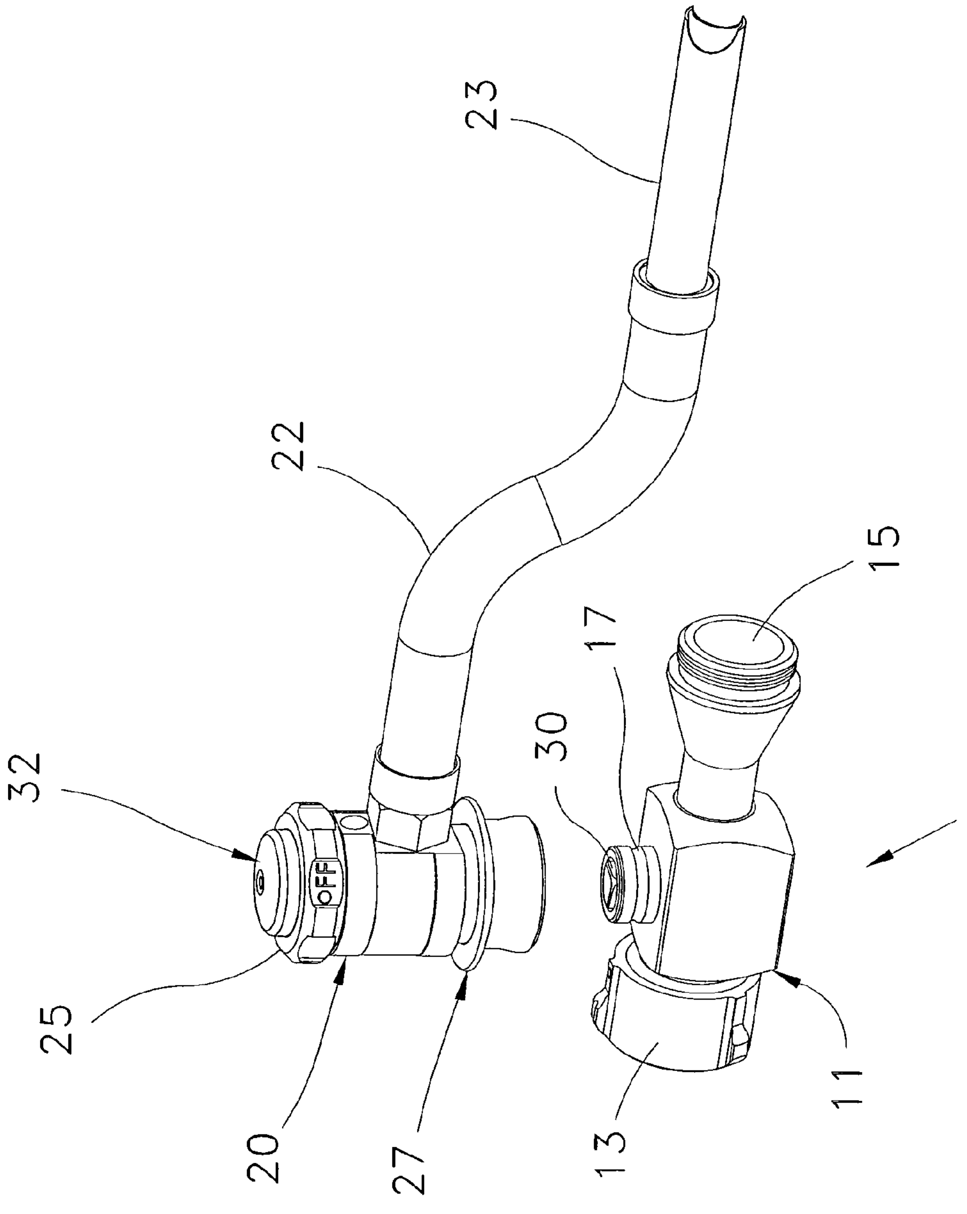
FIG. 2 is a perspective view of the components of an eductor assembly in accordance with one embodiment of the invention.

In accordance with one embodiment of the invention, the eductor valve E shown in FIG. 1 includes an eductor assembly 10, as illustrated in FIG. 2. This assembly includes a main body 11 having a water inlet 13 and an outlet 15. A foam inlet 17 intersects the inlet and outlet and is configured to mate with a metering head 20. The metering head 20 is connected to a suction hose 22 that terminates in a wand 23. The wand 23 is configured to engage the foam bucket F (FIG. 1) in a conventional manner to draw foam concentrate from the bucket by venturi flow of water through the main body 11. The metering head 20 includes a mating ring assembly 27 that is configured for quick connect and disconnect to the foam inlet 17. A proportioning knob 25 can be rotated to adjust the quantity of chemical additive fed through the metering head 20 into the main body 11.

Figure 3:
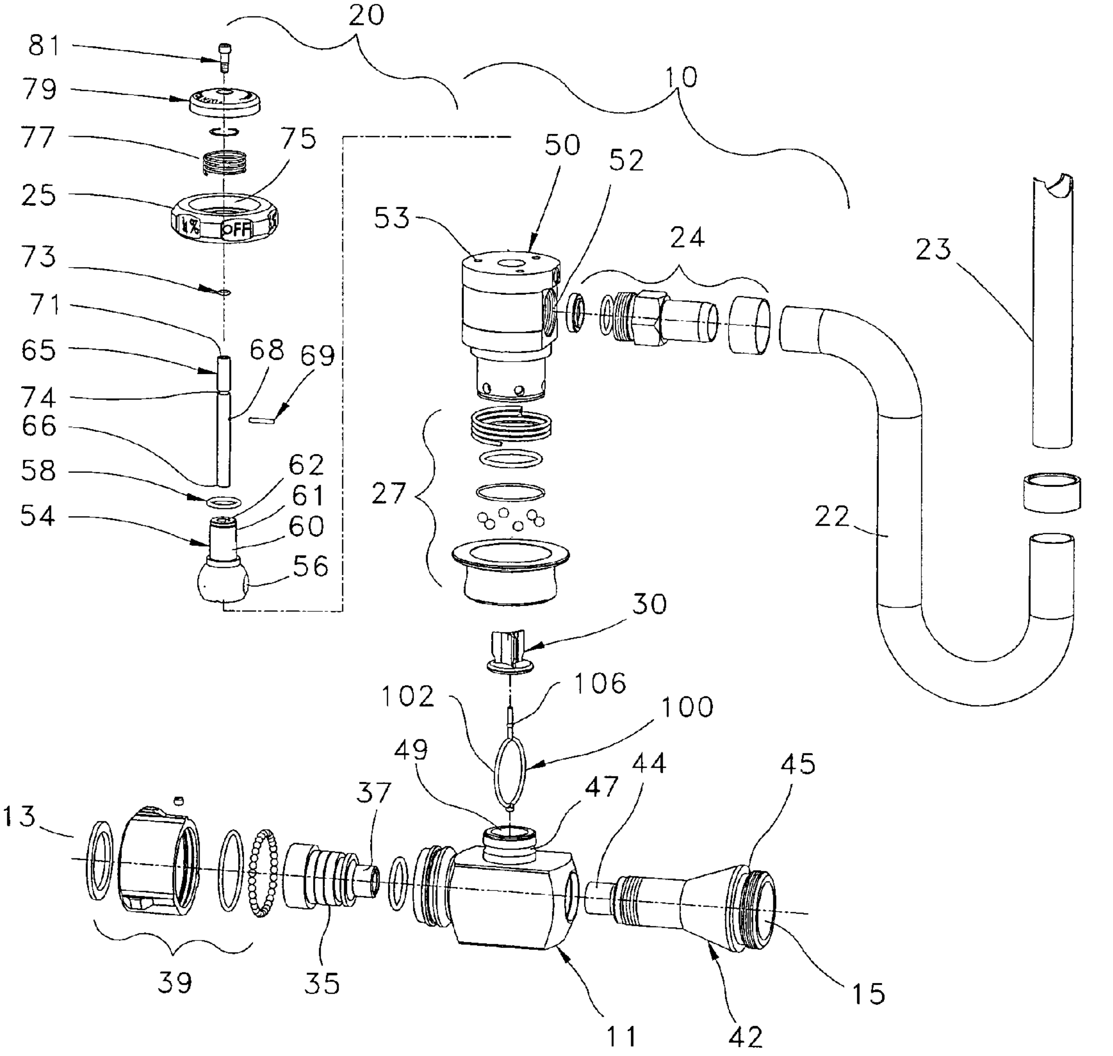
FIG. 3 is an exploded view of the eductor assembly depicted in FIG. 2.
Figure 4:
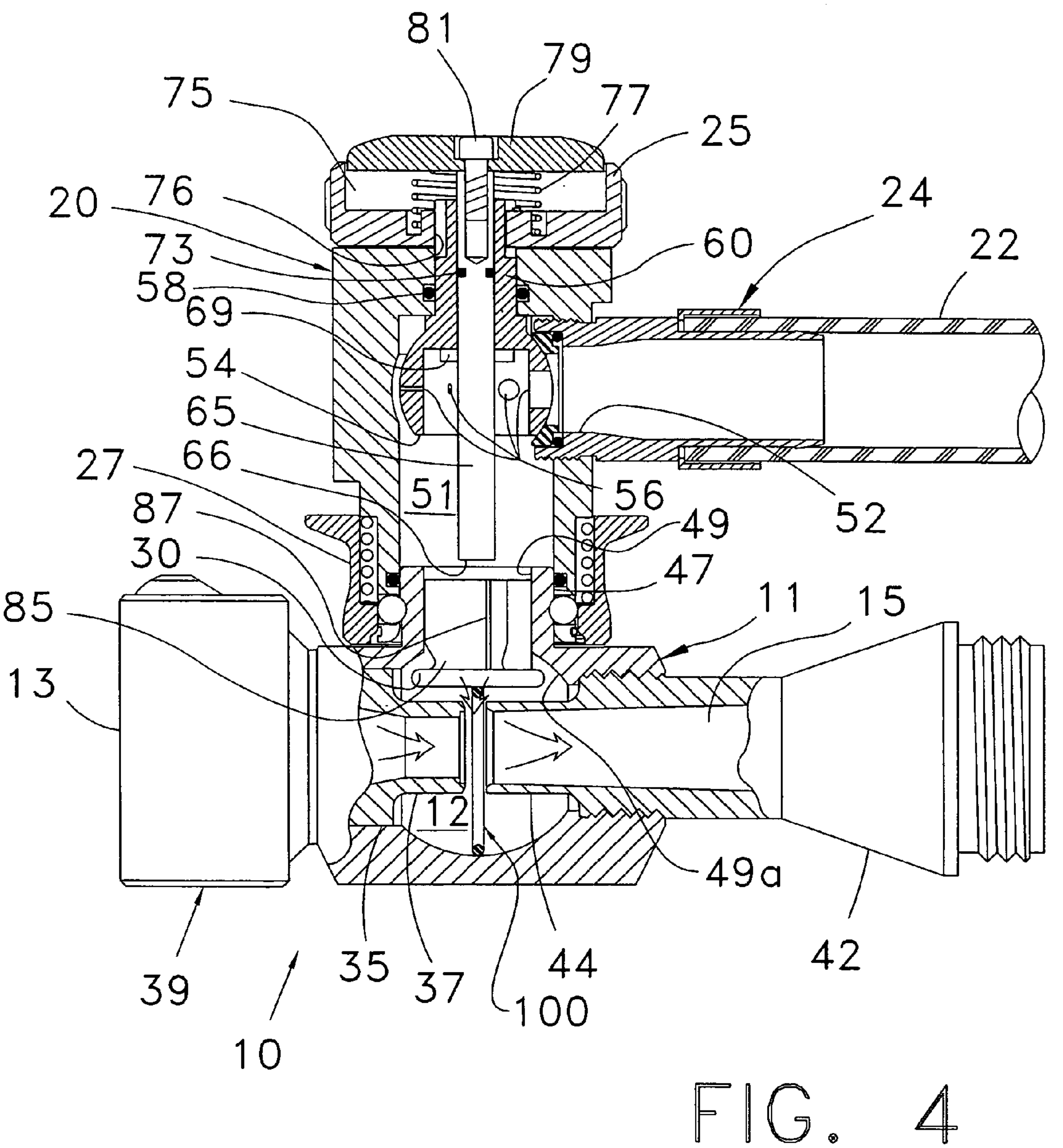
FIG. 4 is a side partial cross-sectional view of the eductor assembly shown in FIGS. 2-3.

As shown in the detail view of FIGS. 3 and 4, the eductor assembly as thus far described is of known construction. For instance, the main body 11 is hollow and defines a plenum 12 (FIG. 4) into which the chemical or foam additive is drawn. A blending tube 35 is situated at the inlet 13 of the body 11, terminating in a nozzle end 37 within the plenum 12. A coupling assembly 39 mounts the blending tube 35 within the body and provides an interface for engagement to a fire hose $H_1$ (FIG. 1). The coupling assembly 39 can be of known construction, including, for instance, a ball bearing mounted threaded coupling ring sized to mate with a 1½ inch fire hose connection. The coupling assembly 39 facilitates ready removal and replacement of the blending tube 35 to substitute a tube sized for different water flow rates.

At the outlet 15, the body 11 mates with a discharge nozzle 42. The nozzle 42 terminates in a nozzle end 44 within the plenum 12 and is arranged to receive water or a water/chemical mixture when water is supplied under pressure at the inlet 13. The discharge nozzle 42 includes a coupling end 45 that is configured in a known manner for engagement to a hose $H_2$ or nozzle N. The discharge nozzle 42 is configured for threaded engagement within the main body 11. Different discharge nozzles can be provided with differently sized outlets 15 to achieve selectable exit flow rates. In addition, the size of the inlet 13 to the eductor is preferably correlated to the discharge nozzle outlet size to achieve these flow rates.

The metering head 20 mates with the additive or foam inlet conduit 47 of the main body 11. The mating ring assembly 27 can be configured in a known manner to provide a quick connect/disconnect fitting arrangement, as depicted in FIG. 3. The mating ring assembly 27 allows a number of metering heads to be engaged to an eductor body depending upon the desired chemical/foam flow rate.

The metering head 20 includes a metering body 50 that defines a foam inlet 52. A fitting assembly 24 connects the suction hose 22 to the metering body in a known manner. The metering body defines a cavity 51 that communicates with the inlet 52. A proportioning ball 54 resides in and is rotatable within the cavity to align a plurality of differently sized metering orifices 56 with the inlet 52. In a specific example, the proportioning ball includes five orifices of different sizes and shapes to correspond to different proportional settings for foam consumption, as well as a no flow or "off" setting in which the foam inlet 52 is blocked. In this specific example, the orifices correspond to ¼%, ½%, 1%, 3% and 6% ratios of foam concentrate to water volume. The two smaller settings correspond to small orifice diameters and are typically better suited for Class A foams. The larger settings are typically better suited for Class B foams.

The proportioning ball 54 includes a stem 60 that extends through a bore 53 in the metering body. The stem 60 is connected to the proportioning knob 25 to rotate with the knob. In a specific embodiment, the stem 60 extends through a bore 76 in the knob and includes a notch 61 that can interlock with a rib (not shown) within the bore so that the two components rotate together. An O-ring 58 between the proportioning ball 54 and the metering body helps prevent leakage through the bore 53. As best seen in FIG. 4, the metering ball 54 provides a fluid path from the foam inlet 52 through a selected metering orifice 56 and into the cavity 51 of the metering body. The knob preferably includes indicia corresponding to the position of the proportioning ball 54 relative to the foam inlet 52.

When the metering head 20 is mounted on the eductor main body 11, the metering cavity 51 communicates with the plenum 12 through a passageway 49 defined in the additive inlet conduit 47. As is known in the art, water flowing from the nozzle end 37 of the blending tube 35 into the nozzle end 44 of the discharge nozzle 42 causes a pressure drop within the plenum. This pressure drop pulls or educts fluid from the foam bucket F through the wand 23, creating a high speed flow of the chemical additive or foam concentrate. This educed fluid mixes with the water as it is discharged through the discharge nozzle 42.

In order to prevent unwanted backflow of water from the plenum into the metering head 20, a check valve 30 is provided within the foam inlet conduit 47, as shown in FIGS. 3-4. In a preferred embodiment of the invention, the check valve 30 includes a valve disc 85 that has a diameter greater than the diameter of the passageway 49 defined in the inlet conduit 47. More specifically, the valve disc 85 is sized to engage a valve seat 49*a* to completely close the passageway 49 to prevent the backflow of water into the inlet conduit and metering head.

The check valve 30 includes an arrangement of wings 87 projecting upward from the disc 85 into the passageway 49. The wings are configured to constrain and guide the check valve so that it translates along the axis of the passageway and so that the valve disc 85 seats flush with the valve seat 49*a* in the main body 11 to close the passageway 49. The upper surface of the disc 85 can include a resilient seal ring 91 to improve the sealing capability of the check valve. Alternatively, the disc itself can be formed of a resilient material that deforms slightly under fluid pressure to form a tight seal against the main body. In the preferred embodiment, the check valve, including the disc 85 and wings 87, is formed of a plastic material.

The wings 87 have a height calibrated so that the wings remain substantially disposed within the passageway even when the valve disc 85 is in contact with one or both of the nozzle ends 37, 44. Under normal operating conditions, the valve disc 85 will remain trapped between the nozzle ends and the additive inlet as the venturi suction pulls the disc downward and induces chemical fluid flow through the metering head 20. However, once the venturi suction falls below a threshold value, or when no fluid is flowing through the metering head, the inlet water pressure will push the check valve upward until the valve disc seals against the main body and closes the inlet passageway 49. This condition will occur in response to a termination of the flow downstream, such as when the nozzle N is shut off or when the hose $H_2$ is kinked. Under normal operating conditions, the check valve will remain closed (preventing backflow into the metering head) when the fire hose nozzle N (FIG. 1) is off, since there is no flow through the eductor to produce venturi suction. However, once the nozzle is opened, water flow commences and the check valve opens to draw the chemical additive or foam concentrate into the plenum 12.

As thus far described, the check valve 30 presents the same problem experienced by the prior eductor valves with respect to cleaning the eductor assembly 10. In order to alleviate this problem, the present invention contemplates a system for holding the check valve 30 in an open position—i.e., with the valve disc 30 unseated or offset from the eductor body, leaving the passageway 49 substantially unobstructed even under water pressure. In order to achieve this objective, the preferred embodiment of the invention includes a back flush pin 65 (FIGS. 3-4) that bears against a contact hub 89 defined at the peak of the wings 87 (see FIG. 5). The pin 65 is slidably disposed within a passageway 62 defined in the stem 60 of the proportioning ball 54. Thus, while the proportioning ball is fixed in translation along the cavity 51, the pin 65 is free to move vertically downward into contact with the hub 89 of the check valve 30 to push the valve downward away from the passageway 49. For the purposes of the present disclosure, the "vertical" direction is defined as along the axis of the metering body 50, and "downward" is movement toward the eductor body 11.

In the illustrated embodiment, the proportioning knob 25 defines a recess 75 within the metering body 50 that communicates with the bore 76. As explained above, the stem 60 of the proportioning ball 54 interlocks with the knob 25 within this bore. O-ring 58 provides a fluid tight seal between stem 60 and metering body 50. A cross pin 69 passes through a bore 68 (FIG. 3) in the back flush pin to set an upper limit for the travel of the pin. An O-ring 73 is mounted within a seal ring groove 74 in the pin 65 to provide a fluid-tight seal between the pin and the passageway 62 as the pin translates within the bore.

A push button 79 is threaded onto the end of the back flush pin 65, trapping a return spring 77 within the recess 75. The top end of the back flush pin 65 defines an internally threaded bore 71 to receive a locking screw 81 for fixing the back flush pin 65 to the push button 79. The push button 79 is accessible above the proportioning knob 25 so that the button can be manually depressed when it is desired to clean the eductor assembly 10. When the button is pushed, the back flush pin 65 is driven downward to push against the check valve 30. With the button 79 fully depressed, the check valve is clear of the passageway, creating a back flush flow path from the water inlet 13 through the eductor assembly 10. The eductor assembly does not need to be disconnected from the water supply, but instead remains connected as it was during the firefighting action. Water from the pumping unit P of the fire truck T, through fire hose $H_1$, can be supplied directly to the eductor assembly to flush all of the chemicals out of the assembly components. The flushed liquid is discharged through the suction hose 22 and wand 23, which means that the wand can be placed within an appropriate receptacle to receive the back flush liquid waste.

In a typically cleaning process after use, the wand is removed from the foam supply F and optionally placed in a discharge container. The water flow through the supply hose $H_1$ is significantly reduced from the typical fire-fighting water pressure and flow rate. In a specific embodiment, the back flush water pressure is reduced to below 45 psi (as compared to a typical operating pressure of about 200 psi). With the nozzle N closed (to prevent water flow through the hose $H_2$), the back flush button 79 is depressed to release the check valve 30 and allow the water to flow back through the metering body 50, suction hose 22 and suction wand 23. The proportioning knob 25 rotated as the water continues to back flush so that water passes through every foam metering orifice 56 in the proportioning ball 54. Back flushing continues at each metering setting until there is no visible foam in the flush water. At that point, the water supply is stopped and the metering head 20 is removed from the main body 11 by manipulating the mating ring assembly 27. The residual water within the metering body 50 and main body 11 can be gravity drained.

Figure 5:
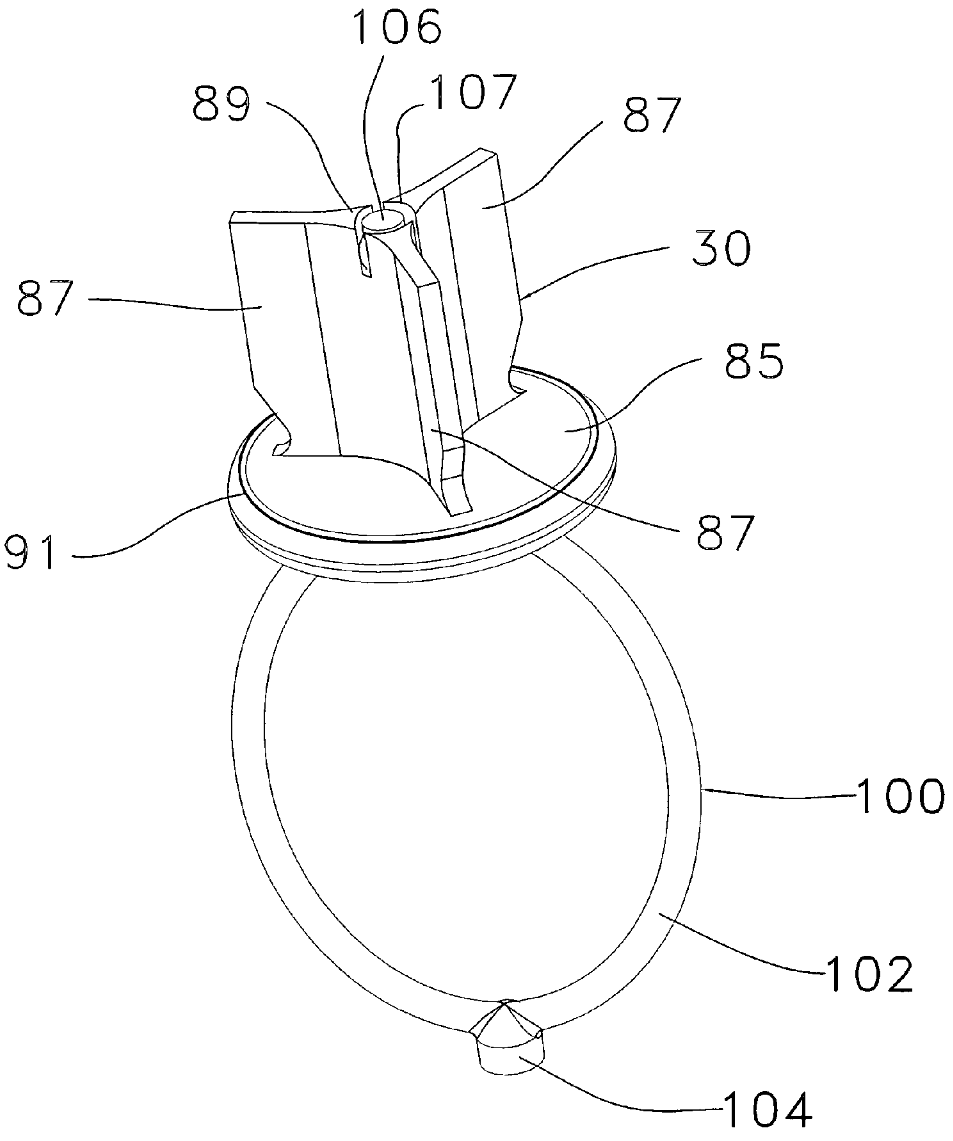
FIG. 5 is an enlarged perspective view of a check valve for use in one embodiment of the present invention.

Under certain conditions, the check valve 30 may not properly engage the valve seat 49*a* (FIG. 4) to fully close the passageway 49. In order to ensure a proper sealing engagement, the check valve 30 may be provided with a return element 100, as shown in FIG. 5. The return element 100 includes a ring 102 that defines an opening that is preferably larger than the flow path through the outlet 15 so as not to impede the flow of fluid through the eductor 10. A base 104 is provided on the ring to bear against the wall of the plenum 12.

The element 100 further includes an elongated stem 106 projecting upward from the ring 102. The stem passes through a bore 107 defined in the hub 89 of the check valve 30. In the preferred embodiment, the stem 106 is long enough to pass completely through the check valve bore 107.

The ring 102 is formed of a corrosion resistant material that is flexible and resilient. In a preferred embodiment, the ring is formed of a thermoplastic elastomer, such as ALCRYN®. When the back flush pin 65 is depressed, the check valve 30 bears against the ring 102 to deform the ring. In a preferred embodiment, the ring 102 is circular in its installed shape, and becomes generally oval as it is deformed under pressure from downward movement of the check valve. The return element is configured so that it can be deformed when the check valve opens under venturi pressure. In the preferred embodiment, the opening force due to venturi pressure is about ½ ounce. In addition, when the back flush pin 65 is depressed, the check valve 30 bears against the ring 102 to deform the ring. When the back flush pin is release, the ring 102 seeks its neutral shape so that it springs back to its original oval shape. In so doing, the ring 102 pushes the check valve 30 upward into engagement with the valve seat 49*a*. Moreover, as the ring 102 pushes the valve upward, the stem 106 keeps the check valve in proper alignment so the disc 85 bears fully against the valve seat.

In certain embodiments, the ring 102 is sized so that in its neutral or un-deformed shape the base 104 contacts the wall of the plenum 12 while the top of the ring is also in contact with the disc 85 of the check valve. Alternatively, the ring may be sized so that the top of the ring 102 is slightly offset from the disc 85 so as not to impede the downward movement of the check valve under venturi pressure only. However, in this alternative, the ring is sized so that the ring may be deformed when the back flush pin 65 is fully depressed.

In the preferred embodiment, the return element is in the form of a ring so that the return spring force produced by the element 100 will be directed substantially along the axis of the elongated stem 106. Other forms of the return element may be contemplated provided that the element does not interfere with the flow of fluid through the eductor and that the element operates to accurately return the check valve to the valve seat. For example, in lieu of the complete ring 102, the return element 100 may include a pair of resilient legs extending downward and outward from the check valve to contact the side walls of the plenum 12.

The internal components of the eductor assembly 10 are formed of materials that are compatible with the types of chemical additives or foam concentrates flowing through the assembly. The component materials are preferably non-reactive with the chemicals and resistant to the corrosive effects of these chemicals. In a specific embodiment, the wand 23 and the back flush pin 65, and ancillary hardware are formed of stainless steel, as is the back flush pin 65. On the other hand, the blending tube 35 can be formed of a high density plastic. Preferably, all the other components are formed of a metal, such as aluminum that has been hard anodized. The proportioning ball 54 and integral stem 60 are also preferably formed of a high density plastic, which beneficially provides a smooth sliding surface for the O-ring 73 as the back flush pin 65 reciprocates within the passageway 62.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, while the illustrated embodiment of the check valve contemplates a disc valve, other one-way valves can be utilized. For instance, a ball valve can be situated within the plenum 12 so that the ball seals against the passageway 49. A cage may contain the ball in alignment with the passageway. The same back flush pin 65 described above can be arranged to bear against the check ball to prevent it from seating over the passageway. In this instance, the pin 65 and inlet conduit 47 would be commensurately sized so that the pin is clear of the ball valve during normal use but is capable of extension into contact with the ball when it is desired to back flush the eductor assembly.

Similarly, the check valve can be a resilient valve, such as a duckbill valve. With this type of valve, the working end of the back flush pin can be modified to hold open the duckbill when the pin is pushed through the valve.

As a further example, the illustrated embodiment contemplates a push button feature for actuating the back flush pin 65. Other means and mechanisms for actuating the pin are contemplated by the present invention. For instance, a pivoting or sliding lever can be integrated into the side wall of the metering body so that manipulation of the lever will push the check valve to its open position. Non-contact actuation is also contemplated, such as a magnetically coupled valve.

What is claimed is:

1. An eductor assembly for use with firefighting equipment comprising:

an eductor body defining a fluid inlet connectable to a source of a firefighting fluid, a fluid outlet for dispensing fluid therefrom in fluid communication with said fluid inlet, an additive inlet connectable to a source of an additive to the firefighting fluid and in fluid communication with said fluid outlet;

a check valve disposed between said additive inlet and said fluid outlet and moveable, in response to a flow of firefighting fluid through said fluid inlet, between a first position operable to prevent back flow of firefighting fluid through said additive inlet and a second position to permit flow of additive through said additive inlet to said fluid outlet;

an actuator operable from outside said eductor body to move said check valve to said second position, said actuator including;

an elongated pin having a proximal end manually accessible outside said eductor body and an opposite working end engageable with said check valve to move said check valve to said second position; and said actuator includes means for biasing said pin away from engagement with said check valve.

2. The eductor assembly of claim 1, wherein said fluid inlet and said fluid outlet are arranged to form a venturi to educe fluid through said additive inlet by suction.

3. The eductor assembly of claim 2, wherein said check valve is moveable to said second position in response to the suction generated by said venturi.

4. An eductor assembly, for use with firefighting equipment comprising:

an eductor body defining a fluid inlet connectable to a source of a firefighting fluid, a fluid outlet for dispensing fluid therefrom in fluid communication with said fluid inlet, an additive inlet connectable to a source of an additive to the firefighting fluid and in fluid communication with said fluid outlet;

a check valve disposed between said additive inlet and said fluid outlet and moveable, in response to a flow of firefighting fluid through said fluid inlet, between a first position operable to prevent back flow of firefighting fluid through said additive inlet and a second position to permit flow of additive through said additive inlet to said fluid outlet;

an actuator operable from outside said eductor body to move said check valve to said second position; and a metering head in fluid communication with said additive inlet, said metering head including a metering inlet connectable to the source of an additive and an adjustable metering element disposed between said metering inlet and said additive inlet, wherein said actuator is supported by said metering head to engage said check valve to move said check valve to said second position.

5. The eductor assembly of claim 4, wherein said actuator is an elongated pin slidably disposed within said metering head and having a proximal end manually accessible outside said metering head and an opposite working end engageable with said check valve to move said check valve to said second position.

6. The eductor assembly of claim 5, wherein said actuator includes a push button mounted to said proximal end of said pin.

7. The eductor assembly of claim 6, wherein said metering element is connected to a proportioning knob movably mounted to said metering head, said knob defining a recess for receiving said push button and a bore communicating with said recess slidably receiving said pin therethrough.

8. The eductor assembly of claim 7, further comprising a mating assembly between said metering head and said additive inlet of said eductor body for removably coupling said metering head thereto.

9. The eductor assembly of claim 7, wherein said actuator includes a spring between said push button and said proportioning knob within said recess, said spring arranged to bias said pin away from engagement with said check valve.

10. The eductor assembly of claim 5, wherein said pin extends through said metering element.

11. The eductor assembly of claim 10, wherein said metering element includes:

a hollow proportioning ball defining a plurality of differently sized metering openings arranged to be selectively aligned with said metering inlet; and a hollow stem coupled to said proportioning ball and defining a passageway with said pin slidingly disposed therethrough.

12. The eductor assembly of claim 11, wherein said actuator includes a fluid sealing element disposed between said pin and said hollow stem.

13. The eductor assembly of claim 1, wherein said check valve includes:

a valve disc sized to close said additive inlet in said first position; and a number of alignment wings projecting from said valve disc into said additive inlet when said check valve is in either of said first and second positions.

14. The eductor assembly of claim 13, wherein said number of wings defines a hub arranged to be engaged by said actuator when said actuator is operated to move said check valve to said second position.

15. An eductor assembly, for use with firefighting equipment comprising:

an eductor body defining a fluid inlet connectable to a source of a firefighting fluid, a fluid outlet for dispensing fluid therefrom in fluid communication with said fluid inlet, an additive inlet connectable to a source of an additive to the firefighting fluid and in fluid communication with said fluid outlet;

a check valve disposed between said additive inlet and said fluid outlet and moveable, in response to a flow of firefighting fluid through said fluid inlet, between a first position operable to prevent back flow of firefighting fluid through said additive inlet and a second position to permit flow of additive through said additive inlet to said fluid outlet;

an actuator operable from outside said eductor body to move said check valve to said second position; and a return element disposed within said eductor body to contact said check valve in opposition to said actuator, said return element being configured to deform when said check valve is moved to said second position by said actuator, wherein said return element includes a ring disposed between said check valve and said eductor body.

16. The eductor assembly of claim 15, wherein said actuator is an elongated pin having a proximal end manually accessible outside said eductor body and an opposite working end engageable with said check valve to move said check valve to said second position.

17. The eductor assembly of claim 16, wherein said actuator includes a push button mounted to said proximal end of said pin.

18. The eductor assembly of claim 15, wherein said ring has an un-deformed shape of an oval.

19. The eductor assembly of claim 15, wherein:
said return element includes an elongated stem; and
said check valve defines a bore for receiving said elongated stem therethrough.

20. The eductor assembly of claim 19, wherein said actuator defines a bore for receiving a portion of said elongated stem therethrough.

21. A combination for use with firefighting equipment comprising:
a hose for connecting to source of firefighting fluid;
a source of additive to be combined with the firefighting fluid;
an eductor body defining a fluid inlet connected to the hose, a fluid outlet for dispensing fluid therefrom in fluid communication with said fluid inlet, an additive inlet connected to the source of additive and in fluid communication with said fluid outlet;
a check valve disposed between said additive inlet and said fluid outlet and moveable, in response to a flow of firefighting fluid through said fluid inlet, between a first position operable to prevent back flow of firefighting fluid through said additive inlet and a second position to permit flow of additive through said additive inlet to said fluid outlet;
an actuator operable from outside said eductor body to move said check valve to said second position; and
a metering head in fluid communication with said additive inlet, said metering head including a metering inlet connectable to the source of an additive and an adjustable metering element disposed between said metering inlet and said additive inlet, wherein said actuator is supported by said metering head to engage said check valve to move said check valve to said second position.

22. The combination of claim 21, wherein said actuator is an elongated pin having a proximal end manually accessible outside said eductor body and an opposite working end engageable with said check valve to move said check valve to said second position.

23. The combination of claim 22, wherein said actuator includes means for biasing said pin away from engagement with said check valve.

24. The combination of claim 21, further comprising a mating assembly between said metering head and said additive inlet of said eductor body for removably coupling said metering head thereto.

25. The combination of claim 21, wherein said check valve includes:
a valve disc sized to close said additive inlet in said first position; and
a number of alignment wings projecting from said valve disc into said additive inlet when said check valve is in either of said first and second positions.

26. The combination of claim 21, further comprising a return element disposed within said eductor body to contact said check valve in opposition to said actuator, said return element being configured to deform when said check valve is moved to said second position by said actuator.

27. The combination of claim 26, wherein said return element includes a ring disposed between said check valve and said eductor body.

28. The eductor assembly of claim 1, further comprising a fluid seal disposed between said actuator and said eductor body.

29. The eductor assembly of claim 4, further comprising a fluid seal disposed between said actuator and said eductor body.

30. The eductor assembly of claim 15, further comprising a fluid seal disposed between said actuator and said eductor body.

31. The combination of claim 21, further comprising a fluid seal disposed between said actuator and said eductor body.

* * * * *